United States Patent
Tawa

[11] 3,729,788
[45] May 1, 1973

[54] APPARATUS FOR ADJUSTING THE ALTITUDE OF A CHORD OF AN EXPANDING ROLL

[75] Inventor: Kan Tawa, Takatsuki, Japan

[73] Assignee: Yamauchi Rubber Industry Co., Ltd., Osaka, Japan

[22] Filed: June 3, 1971

[21] Appl. No.: 149,519

[30] Foreign Application Priority Data

June 5, 1970 Japan ....................... 45/48613

[52] U.S. Cl. ............................................. 29/116 AD
[51] Int. Cl. ............................................. B21b 13/02
[58] Field of Search .................. 29/116 R, 116 AD; 26/63

[56] References Cited

UNITED STATES PATENTS

| | | |
|---|---|---|
| 2,547,975 | 4/1951 | Robertson .................. 29/116 R X |
| 2,960,749 | 11/1960 | Robertson et al. ......... 29/116 R X |
| 3,213,513 | 10/1965 | Robertson .................. 29/116 R X |
| 3,308,519 | 3/1967 | Westgate .................... 29/116 R X |
| 3,357,073 | 12/1967 | Eury .............................. 26/63 |
| 3,376,620 | 4/1968 | Miller ............................ 26/63 |
| 3,500,524 | 3/1970 | Jagminas ..................... 29/116 R |

*Primary Examiner*—Alfred R. Guest
*Attorney*—Woodhams, Blanchard & Flynn

[57] ABSTRACT

An apparatus for adjusting the altitude of the chord of an expanding roll comprising;

1. a central shaft bent in an arc-shape with the amount of radial deflection increasing successively toward the middle thereof with respect to an imaginary straight line corresponding to the axis of an unbent central shaft, 2. a plurality of eccentric discs or bushes rotatably fitted around said shaft and being spaced lengthwise along the axis thereof, said bushes having their eccentricities increasing successively toward the middle of said shaft, 3. a plurality of sleeves in which said bushes are inserted and are rotatably supported therein by means of intermediate ball bearings, 4. a rubber roll covering said sleeves and integrated therewith to form a single rotatable unit, 5. a plurality of annular coupling members rotatably fitted onto said central shaft and disposed between said bushes and coupled with adjacent bushes, 6. a rod disposed rotatably within a groove extending lengthwise on the periphery of said central shaft and engaged with said annular coupling members in order to rotate same relative to said central shaft, 7. and bearings journaling said central shaft so as to keep it fixed thereto, but, in case of need, to permit it to turn therein.

3 Claims, 9 Drawing Figures

Patented May 1, 1973 3,729,788

INVENTOR.
KAN TAWA
BY
Woodhams, Blanchard & Flynn
ATTORNEYS

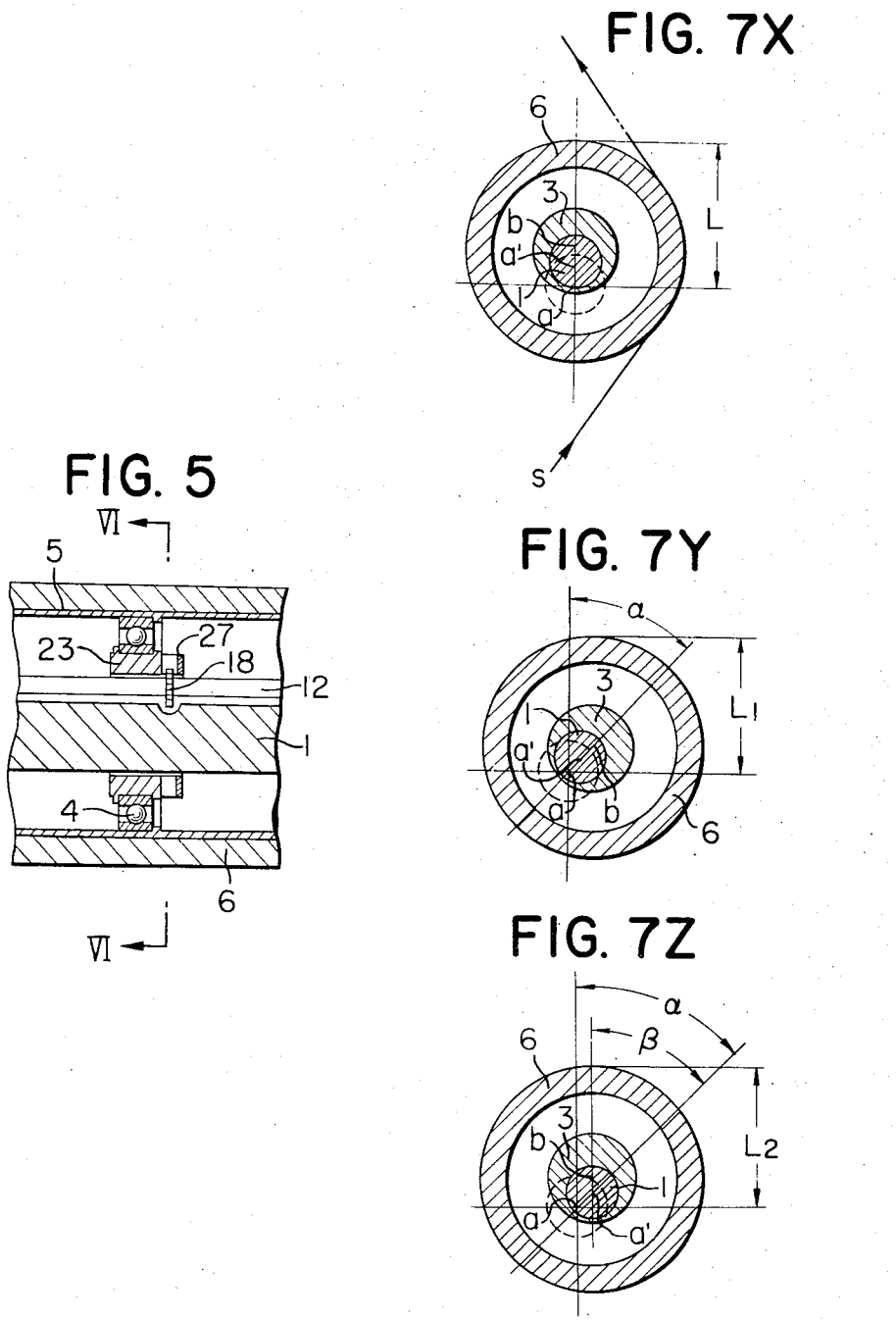

APPARATUS FOR ADJUSTING THE ALTITUDE OF A CHORD OF AN EXPANDING ROLL

BACKGROUND OF THE INVENTION

1. Field of the Invention:

The present invention relates to an apparatus for adjusting the altitude of the chord of a roll for expanding a strip of synthetic resin film, cloth, metal foil, etc.

2. Description of the Prior Art:

In the prior art, no device was provided to achieve an adjustment as above-mentioned, although it is needed to adjust, as required, the altitude of the chord, i.e., the deflection distance between a center line of a central shaft actually bent in an arc-shape and an imaginary straight line corresponding to the axis of an unbent central shaft.

SUMMARY OF THE INVENTION

An object of the present invention is to provide an apparatus for adjusting the altitude of the chord of an expanding roll comprising; a central shaft bent in an arc-shape; a plurality of eccentric bushes fitted rotatably around said shaft with spacing therebetween in the axial direction, said bushes having eccentricities increasing successively toward the middle of said shaft; a plurality of sleeves in which said bushes are inserted and with the intermediate ball bearings being provided therebetween; a rubber roll covering said sleeves and integrating with them in a unit, said rubber roll thus being disposed eccentrically relative to said central shaft.

Another object of the present invention is to provide an apparatus for adjusting the altitude of the chord of an expanding roll, wherein a central shaft is journaled at its one end by bearing so as normally to be fixed against rotation, but in case of need, capable of being rotated. The central shaft is rotatable relative to said bearings together with a plurality of bushes, sleeves and a rubber roll, so as to deflect said rubber roll for the purpose of adjusting the altitude of the chord of said rubber roll.

A further object of the present invention is to provide an apparatus for adjusting the altitude of the chord of an expanding roll, wherein a plurality of annular coupling members couple said bushes to each other and a rotatable rod is received in a groove extending lengthwise in periphery of said central shaft. The coupling members are provided with small gears to engage with perforations of said annular coupling members, so as to turn concurrently said annular coupling members together with the bushes, by rotating the rod, while said central shaft is maintained non-rotating in said bearing, so that said rubber roll its deflected for the adjustment of the altitude of the chord of the rubber roll.

A still further object of the present invention is to provide an apparatus for adjusting the altitude of the chord of an expanding roll, wherein each of said bushes is provided with a plurality of perforations and, said rotatable rod, disposed within a groove extending lengthwise in the periphery of said central shaft, is provided with small gears to engage with perforations of said bushes so as to rotate each bush concurrently relative to said central shaft which is maintained stationary in order to deflect the rubber roll.

BRIEF DESCRIPTION OF THE DRAWINGS

FIG. 5 is a fragment of the longitudinal cross-section of a principal portion of an alternate preferred embodiment according to the present invention.

FIGS. 7X, 7Y and 7Z are views taken along a section adjacent to the middle of a central shaft to illustrate how the altitude of the chord of a rubber roll is adjusted by showing the relative dispositions of the central shaft, an eccentric bush and a rubber roll, in the respective cases of a normal position (X) and adjusted positions (Y), (Z).

DETAILED DESCRIPTION OF THE INVENTION

Figure 1:
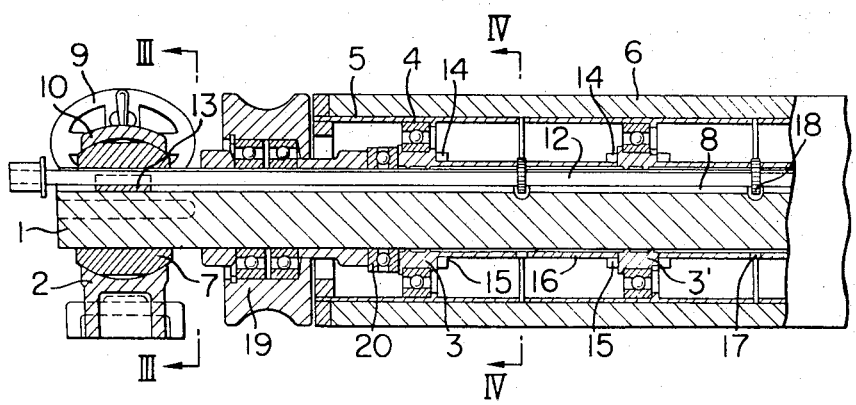
FIG. 1 is a longitudinal cross-section of a fragment of a preferred embodiment of the present invention.
Figure 2:
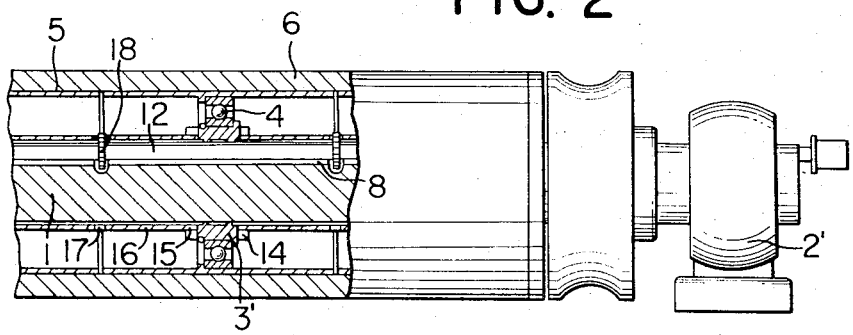
FIG. 2 is a partial longitudinal cross-sectional view illustrating the right-side of the preferred embodiment of the present invention shown in FIG. 1.

Now, referring to FIGS. 1 and 2, a central shaft 1 of a first preferred embodiment is journaled at both its ends by bearings 2, 2' and is bent in an arc-shape to have a radial deflection increasing successively toward the middle of said shaft. Around said central shaft 1 are fitted a pair of end eccentric discs or bushes 3 and a plurality of intermediate eccentric discs or bushes 3' having eccentricities increasing successively toward the middle of said shaft. The bushes 3, 3' are inserted within sleeves 5 so as to be rotatable therein by means of intermediate ball bearings 4. A rubber roll 6 covers said sleeves 5 and integrates them in a unit.

Figure 3:
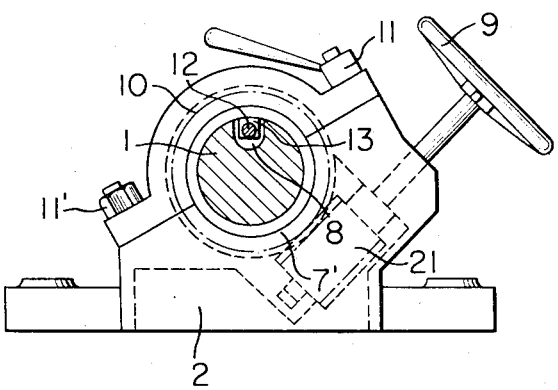
FIG. 3 is a sectional view taken along the line III — III in FIG. 1.

As shown in FIGS. 1 and 3, within the middle portion of the bearing 2 located at one end of the central shaft, a worm gear 7 is fixed to said central shaft, while said bearing 2 is provided with a worm 21, which engages with said worm gear 7.

A handle 9 is fixedly mounted on the shaft of said worm 21. A cover 10 of the bearing 2 is fastened to the body of said bearing 2 by bolts 11,11' and, presses against said central shaft strongly enough to normally fix it to said bearing.

On the peripheral portion of the central shaft there is provided a lengthwise groove 8, in which a rod 12 is rotatably disposed. The rod 12 is support by a supporter 13, as illustrated in FIGS. 1 and 3, so that the rod cannot move in the axial direction. The rod 12 can be rotated by means of a handle (not shown) placed on the leftward end of the rod as appearing in FIG. 1.

Each of eccentric bushes 3' is provided With teeth 14 on both axial sides thereof and the end bushes 3 have teeth 14 on the axially inward sides thereof. Annular coupling members 16 are also provided with teeth 15 at both their ends, so that they can mate with the teeth 14 of adjacent bushes in order to couple with adjacent bushes.

Figure 4:
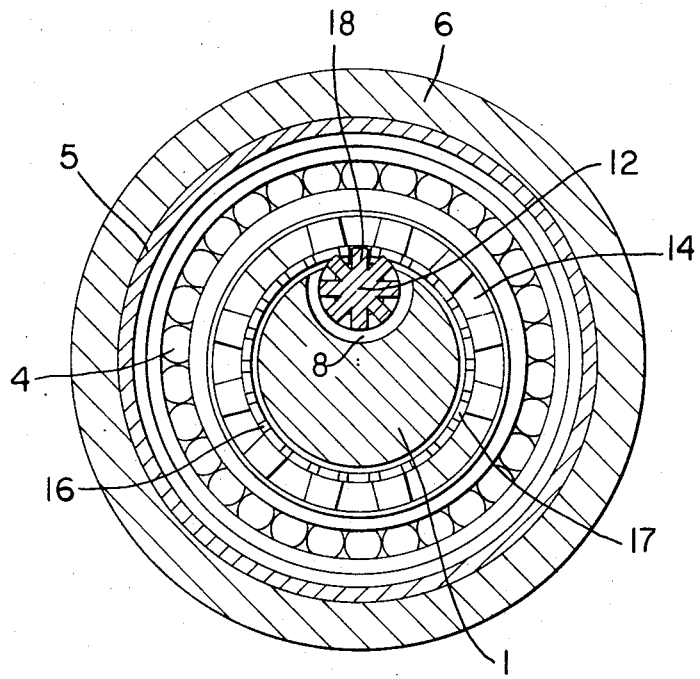
FIG. 4 is a sectional view taken along the line IV — IV in FIG. 1.

Further, said annular coupling members 16 are provided with perforations 17 therearound, which engage with the teeth 18 of a small gear fixedly mounted on said rotatable rod 12, as illustrated in FIG. 4.

The numeral 19 denotes a positioner for the expanding roll, connected therewith through the intermediate of the eccentric bush 3 located at the foremost end of the series of bushes and a thrust bearing 20.

Figure 6:
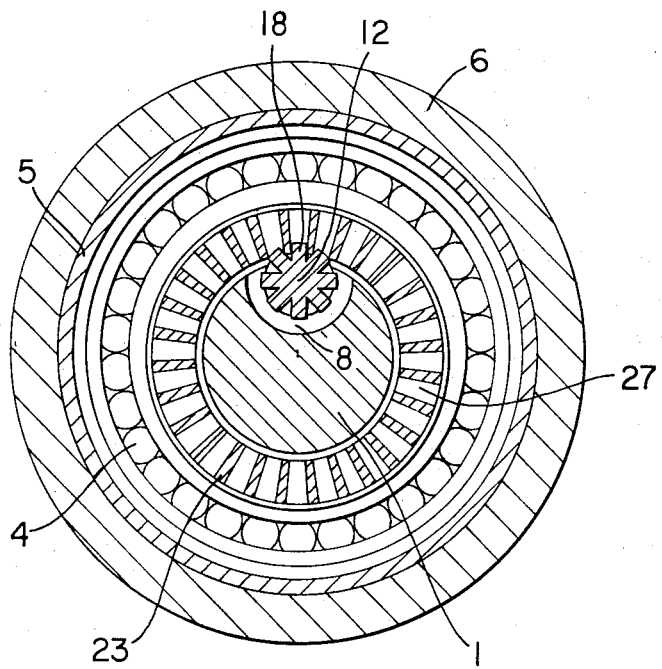
FIG. 6 is a cross-sectional view taken along the line VI — VI in FIG. 5.

In a second embodiment shown in FIGS. 5 and 6, the annular coupling members are omitted; but each of the eccentric bushes 23 is provided with perforations 27, with which the teeth 18 of the small gear of the rotatable rod 12 engage.

Now, with respect to foregoing apparatuses, a description will be made regarding how to adjust the altitude of the chord of a rubber roll, referring to FIGS. 7X, 7Y and 7Z.

When it is desired to smooth away rumples as much as possible from a material to be treated for expanding, the altitude (L) of the chord must be increased thereby.

For this purpose, the roll should be set up in a normal position so as to make the altitude L of the chord a maximum, as illustrated in FIG. 7(X).

In FIGS. 7X, 7Y and 7Z, there are shown cross-sections of the rubber roll, the eccentric bush and the central shaft taken at the middle of the central shaft. There is also shown in broken lines a cross-section of said shaft which is taken along a vertical line passing through the center of bearing 2. This, therefore, represents the imaginary position of a non-bent central shaft.

Further, as seen in FIGS. 7X, 7Y and 7Z, the center of the imaginary non-bent central shaft is denoted by (a), while the center of the cross-section of said shaft at the middle is denoted by (a') and the center of the cross-sections of the eccentric bush and the rubber roll are denoted by (b).

Accordingly, if the largest altitude of the chord is required, the points of (a), (a') and (b) must be aligned on a perpendicular line as shown in FIG. 7 (X).

On the other hand, if a decreased altitude of the chord is required, firstly the central shaft should be rotated relative to the bearings 2,2', so that the center of the roll is deflected to a slanted position, wherein a segment of line (a) (a') is inclined by an angle with respect to $\alpha$ a perpendicular line passing through (a), and next the eccentric bush is rotated in a counter direction relative to the central shaft so that a segment of line (a') (b) is slanted against a line (a) (a') by an angle $\beta$.

As the result, the maximum altitude (L) is decreased to the altitudes ($L_1$) and ($L_2$), respectively.

OPERATION

Now, with reference to the first and the second preferred embodiments according to the present invention shown in FIGS. 1 to 6, the description will be made hereinunder of the procedure to adjust the altitude of the chord.

In order to accomplish an adjustment illustrated in FIG. 7 (Y), firstly the bolts fitted to the bearing 2 are turned backwardly to unfasten the cover 10 from the body of the bearing so as to loosen the fixation of said cover against the worm gear 7. Then the handle 9 is turned round to rotate the worm 21 together with the worm gear 7 engaging with said worm, so that the central shaft 1 is turned accordingly so as to make a segment (a) (a') slanted at an angle $\alpha$ with respect to a perpendicular line passing through the center (a).

While the central shaft 1 is turned in the foregoing manner, the rotatable rod 12, which is received within the groove 8; the annular coupling member engaging with the small gear fixed to said rotatable rod 12 or the eccentric bushes 23; the eccentric bushes 3,3' whose teeth 14 agree with the teeth 16 of said annular coupling members; the sleeves 5 supported by said eccentrical bushes 3,3',23 or through the intermediate of the ball bearings 4; and the rubber roll 6 covering said sleeved are all slanted simultaneously.

Accordingly, the center (a') with the center (b) are positioned on a line slanted with respect to said perpendicular line, and thereby the maximum altitude of the chord is decreased to the altitude ($L_1$).

Thereafter, the worm gear 7 is pressed toward the bearing 2 by turning forwardly the bolts 11 so as to fasten the cover of the bearing to the body thereof, and thereby the central shaft 1 is tightly pressed and fixed to the bearing to maintain its position unchanged.

Next, in order to make the further adjustment illustrated in FIG. 7 (Z), the rotating rod 12 is turned by a handle (not shown in the drawings) provided at the end portion of the rotating rod, which projects outwardly from end of the central shaft, and the annular coupling members are thereby rotated by means of the engagement of the small gear fixed to said rod with perforations 17 or 27 thereof, so that the eccentric bushes 3,3' are in turn rotated by means of the engagement of the teeth 14 thereof with the teeth 15 defined in said annular coupling members. In like fashion, in the alternate embodiment bushes 23 are rotated directly by the gears 18.

Thus, the center (b) of the rubber roll 6 covering sleeves 5, wherein said eccentric bushes are inserted through the intermediate ball bearings 4, is altered its position so as to make the segment of (b) (a') intersect with the segment (a) (a') at an angle $\beta$, and accordingly the altitude of the chord ($L_1$) is changed to a desired one ($L_2$).

After the altitude of the chord ($L_1$) is changed to the desired one ($L_2$), the rotation of said rod 12 is stopped.

The adjusted magnitude for the altitude of the chord is increased successively toward the middle of the central shaft, because the eccentricity of bushes increases successively toward the middle of said shaft also.

Now, it should be noted that, when the annular coupling members consist of rubber, a much better engagement with the eccentrical bushes is obtained due to the elasticity thereof and, furthermore, the engagement with the small gear of the rotatable rod becomes better than otherwise so as to result in a very smooth rotation of the eccentric bushes.

What is claimed is:

1. An expanding roll construction, comprising:
    an elongated longitudinally curved central shaft whose radial deflection increases successively toward the longitudinal midpoint thereof with respect to an imaginary straight line corresponding to the longitudinal axis of a non-curved central shaft, said central shaft having a longitudinally extending groove in the periphery thereof,
    a plurality of discs eccentrically mounted on said shaft for rotation with respect thereto, said discs being spaced apart lengthwise along said shaft and having eccentricities which increase successively toward the longitudinal midpoint of said shaft, a plurality of sleeves having rolling bearings mounted on the inside thereof, the radially inner sides of said bearings being supported on said discs so that said sleeves can rotate with respect to said discs, a rubber roll covering said sleeves and integrated therewith to form a single rotatable unit, a plurality of annular coupling members rotatably mounted on said central shaft and disposed between said discs and drivingly connected to said discs, an elongated rod disposed within said groove for rotation therein, said rod being drivingly connected to said annular coupling members for effecting rotation thereof relative to said central shaft, journal means journaling said central shaft for rotation about said axis, and releasable means for normally holding said central shaft against rotation in said journal means.

2. An expanding roll construction according to claim 1, wherein said annular coupling members have recesses therein and said rod has small gears thereon, said gears being engaged with the recesses of said annular coupling members, said rod also having an end portion which projects outwardly beyond one end of said central shaft.

3. An expanding roll construction, comprising:

an elongated longitudinally curved central shaft whose radial deflection increases successively toward the longitudinal midpoint thereof with respect to an imaginary straight line corresponding to the longitudinal axis of a non-curved central shaft, said central shaft having a longitudinally extending groove in the periphery thereof, a plurality of discs eccentrically mounted on said shaft for rotation with respect thereto, said discs being spaced apart lengthwise along said shaft and having eccentricities which increase successively toward the longitudinal midpoint of said shaft, said discs also having a plurality of recesses opening toward said shaft, a plurality of sleeves having rolling bearings mounted on the inside thereof, the radially inner sides of said bearings being supported on said discs so that said sleeves can rotate with respect to said discs, a rubber roll covering said sleeves and integrated therewith to form a single rotatable unit, an elongated rod disposed within said groove for rotation therein, said rod having small gears engaging with said recesses of said discs for rotating said discs relative to said central shaft, journal means journaling said central shaft for rotation about said axis, and releasable means for normally holding said central shaft against rotation in said journal means.

* * * * *